(No Model.) 2 Sheets—Sheet 1.
E. KIMBALL.
FRUIT PICKER.
No. 325,546. Patented Sept. 1, 1885.
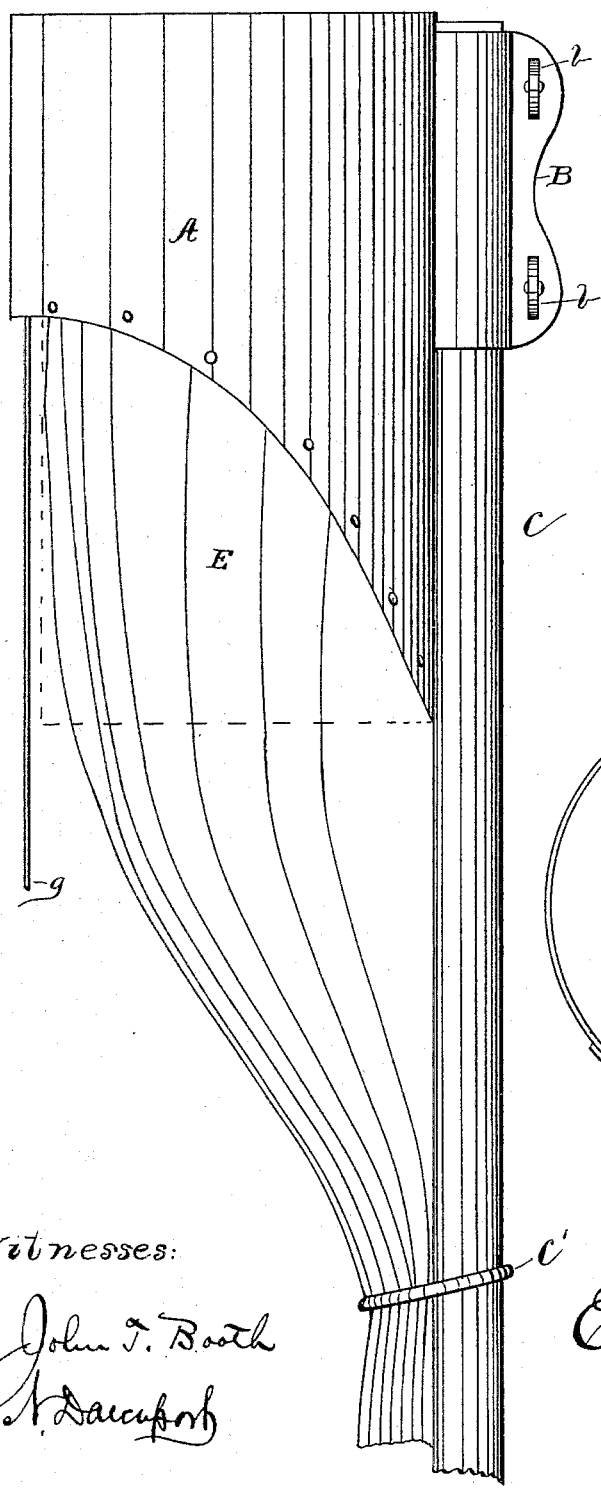
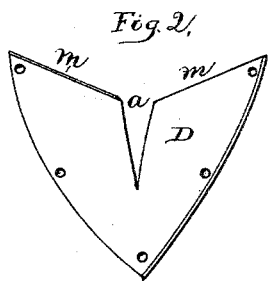
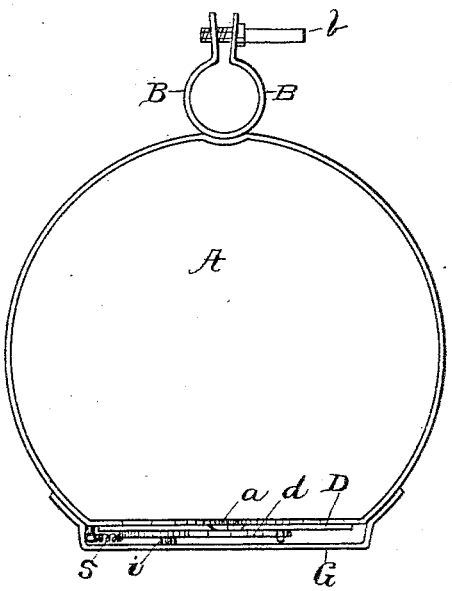
Witnesses:
John T. Booth
N. Davenport
Inventor.
Edmund Kimball
by Geo. A. Mosher
Atty.

(No Model.) 2 Sheets—Sheet 2.
E. KIMBALL.
FRUIT PICKER.
No. 325,546. Patented Sept. 1, 1885.
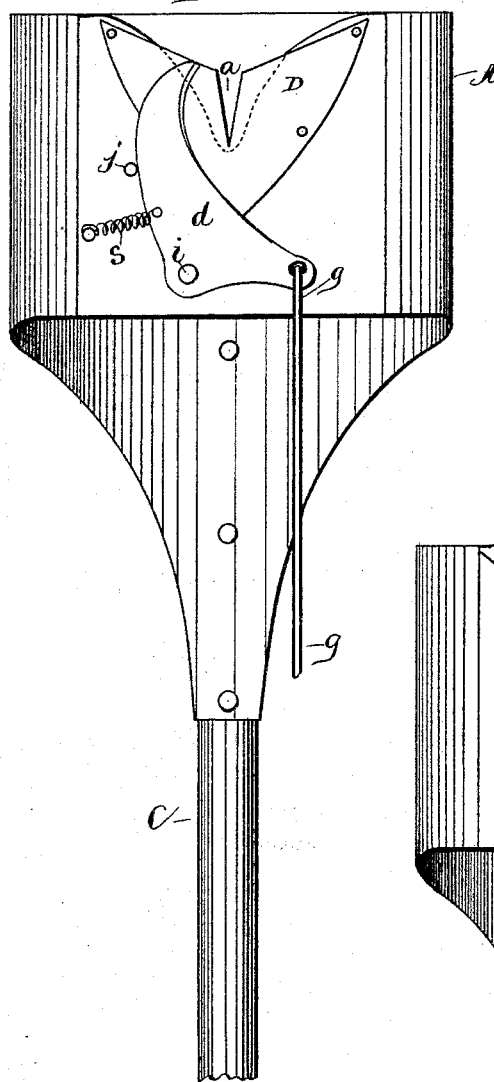
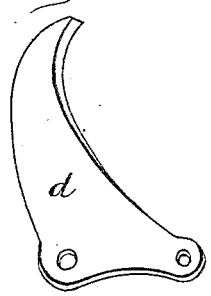
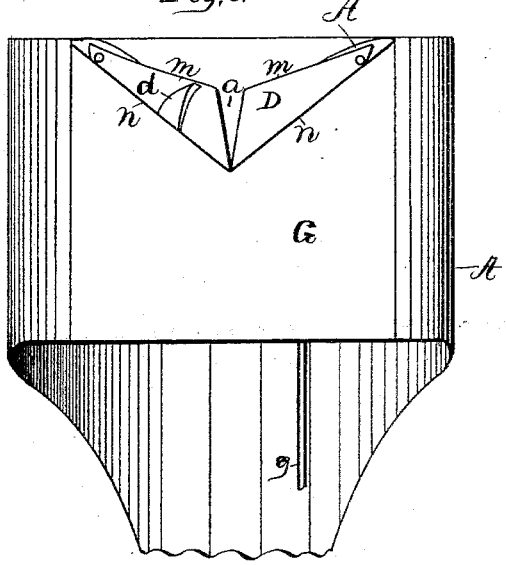
Witnesses.
John T. Booth
N. Davenport
Inventor.
Edmund Kimball
by Geo. A. Mosher
Atty.

UNITED STATES PATENT OFFICE.

EDMUND KIMBALL, OF BRUNSWICK, NEW YORK.

FRUIT-PICKER.

SPECIFICATION forming part of Letters Patent No. 325,546, dated September 1, 1885.

Application filed December 8, 1884. (No model.)

*To all whom it may concern:*

Be it known that I, EDMUND KIMBALL, a resident of the town of Brunswick, in the county of Rensselaer and State of New York, have invented certain new and useful Improvements in Fruit-Pickers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in fruit-pickers.

The object of my invention is to cheaply provide an implement for picking fruit from trees and conveniently delivering the same into suitable receptacles upon the ground.

Figure 1 of the drawings is a side elevation of my improved fruit-picker. Fig. 2 is a front elevation of the notched plate or knife. Fig. 3 is a top plan view of the picker. Fig. 4 is a front elevation, with front guard, G, and bag E removed. Fig. 5 is a perspective of pivoted knife. Fig. 6 is a front elevation of picker without the bag.

A is a fruit-receptacle of any suitable material. It may be cut away at the lower end, and a bag of canvas, E, or other flexible material secured thereto, and tied at the lower end to pole C by ring or cord C', or the receptacle may be of the same material and shape from top to bottom, like a cup, as shown by the dotted lines and solid lines in Fig. 1. The receptacle is secured to one end of a pole, C, by means of the clamps B B, which are shown soldered thereto. The end of the pole is inserted between the clamps, which are then closed by the thumb-screws $b$ $b$.

The receptacle may be secured to the pole by nails, rivets, or bolts $e$, as shown in Fig. 4, but by using the clamps B the receptacle can be easily and quickly adjusted to any height on the pole, and can be easily and quickly removed from the pole when not in use.

One of the vertical walls of the receptacle is left flat or plane, and provided with a metallic plate, D, which has a central vertical notch, $a$, the edges of the notch being beveled to present sharp cutting-edges. The side of the receptacle to which plate D is attached is also notched down to or below the notch $a$, as shown by the dotted line in Fig. 4.

The operation of the picker is as follows: It is borne aloft to a position immediately beneath the fruit by means of a pole, C, which may be of any convenient length. The stem of the fruit is permitted to slide down one of the inclines $m$ into the notch $a$, being assisted thereto, if necessary, by a partial rotation of the pole and receptacle. After the stem has entered the notch the pole is partially rotated by a sudden impulse in either direction, the stem severed by contact with the sharp edges of the notch, and the fruit deposited in the receptacle A. When the receptacle is sufficiently filled, it is easily emptied into another receptacle upon the ground by tipping the pole. Should it be desired to pick fruit having dry hard stems which are not easily severed by the notch alone, the operation can be facilitated by means of the pivoted knife $d$, pivoted at $i$, and held in position before the notch by spring S, which draws the back of the blade against stop $j$.

The cord or rod $g$, attached to the blunt end of the knife, serves to force the blade of the knife past the notch $a$ and cut off any projecting stem which may be in the notch. The cord $g$ may extend downward the whole length of the pole, as desired.

The knives D and $d$ may be detached from the receptacle A when desired for sharpening or removal.

The pivoted knife $d$ is protected from entanglement with the limbs of trees or other objects by the front guard, G, which may be soldered or otherwise fastened to the receptacle.

The services of the pivoted knife will not often be required, as the line of direction of the notch $a$ being parallel to the line of direction of the pole, a slight partial rotation of the pole and receptacle when the fruit-stem is in the notch $a$ will be sufficient to sever the fruit from the tree and permit it to drop into the receptacle beneath.

The plate D being separate or detachable from the receptacle permits its manufacture of steel or other hard metal, and it can be kept sharp by detaching and grinding, as may be required.

I am thus able to cheaply and easily produce a very efficient fruit-picker.

What I claim as new, and desire to secure by Letters Patent, is—

In a fruit-picker, the detachable plate D, having the V-shaped notch $a$, provided with a cutting-edge, and inclines $m\,m$, leading to said notch, in combination with a correspondingly-notched flat side of the receptacle $a$, to which said plate is attached, as shown and described.

In testimony whereof I have hereunto set my hand this 13th day of November, 1884.

EDMUND KIMBALL.

Witnesses:
GEO. A. MOSHER,
W. H. HOLLISTER, Jr.